United States Patent [19]
Smith

[11] 3,987,861
[45] Oct. 26, 1976

[54] APPARATUS FOR NULLIFYING THE EFFECTS OF ANGULAR ACCELERATION OF FRAMES TILTABLY MOUNTING BALANCE BEAMS AND THE LIKE

[75] Inventor: James E. Smith, Boulder, Colo.

[73] Assignee: Mettler Instrumente AG, Zurich, Switzerland

[22] Filed: Sept. 12, 1975

[21] Appl. No.: 612,656

Related U.S. Application Data

[63] Continuation of Ser. No. 538,114, Jan. 2, 1975, abandoned, which is a continuation-in-part of Ser. No. 472,660, May 3, 1944, abandoned.

[52] U.S. Cl. .............................. 177/184; 177/235; 177/246
[51] Int. Cl.² ................... G01G 23/06; G01G 1/26
[58] Field of Search ........... 177/184, 187, 188, 235, 177/246, 255, 250; 74/1

[56] References Cited
UNITED STATES PATENTS

| | | |
|---|---|---|
| 3,347,328 | 10/1967 | Schieser et al. .................... 177/229 |
| 3,498,143 | 3/1970 | Sanford .................................... 74/1 |
| 3,685,604 | 8/1972 | Smith et al. ........................... 177/184 |

Primary Examiner—Joseph W. Hartary
Attorney, Agent, or Firm—Edwin L. Spangler, Jr.

[57] ABSTRACT

A device which includes a frame supporting a lever arm for tiltable movement about a horizontal axis intermediate the ends thereof and, more particularly, to an improved apparatus for nullifying the effects of angular acceleration of such frame relative to its lever arm which comprises a counterweight and hanger means for suspending the counterweight between the frame and arm which cooperate with one another under the influence of inertial forces tending to angularly accelerate one relative to the other by generating an offsetting inertial force operative to maintain a condition of stable equilibrium therebetween.

20 Claims, 8 Drawing Figures

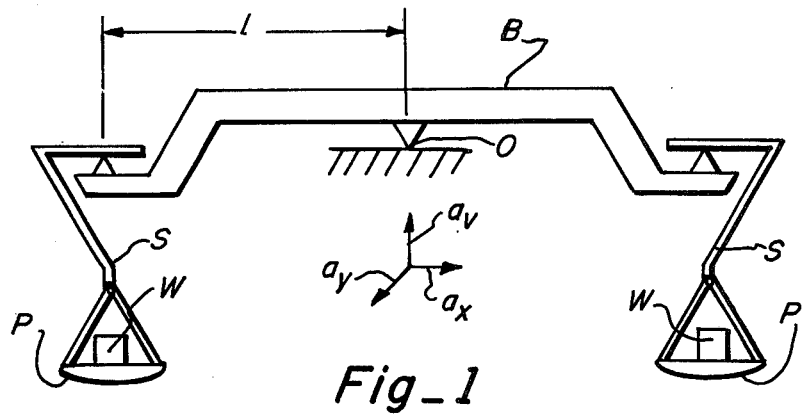
Fig_1
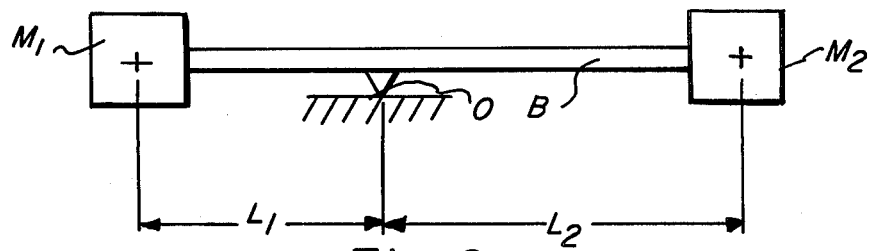
Fig_2
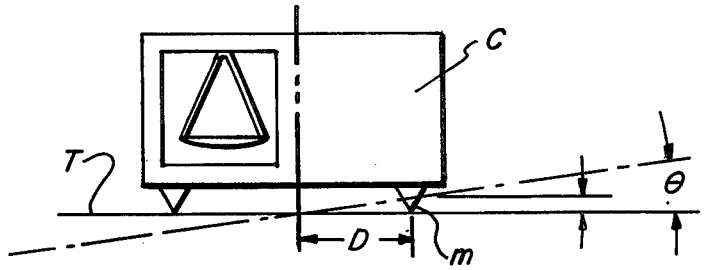
Fig_3
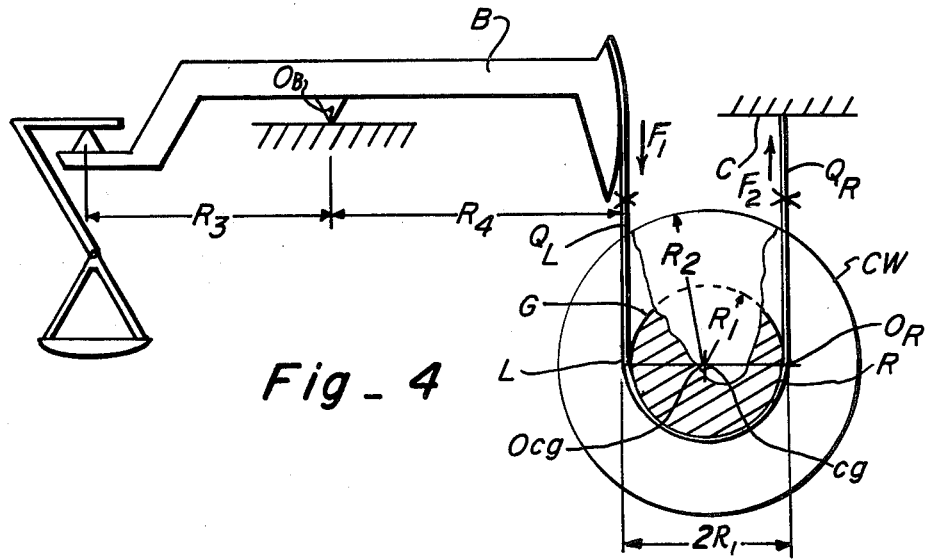
Fig_4

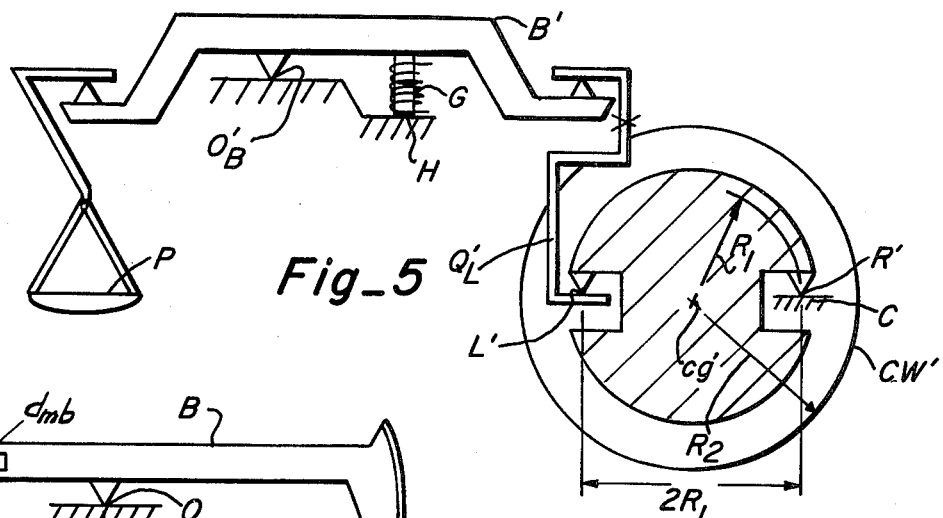
Fig_5
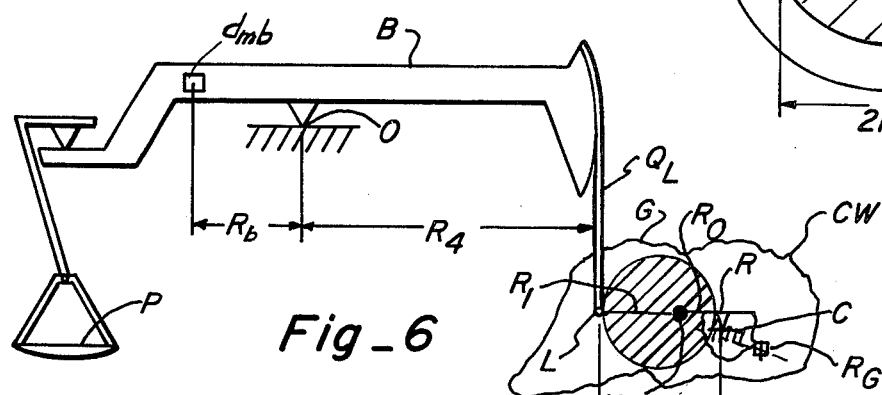
Fig_6
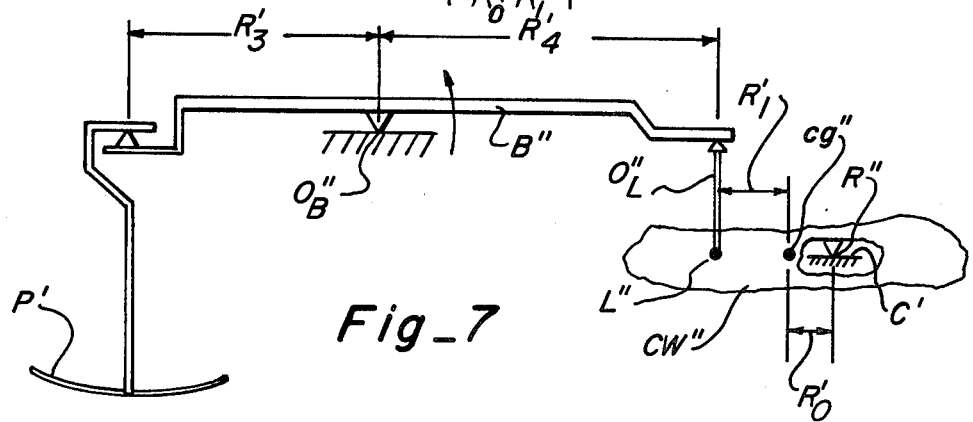
Fig_7
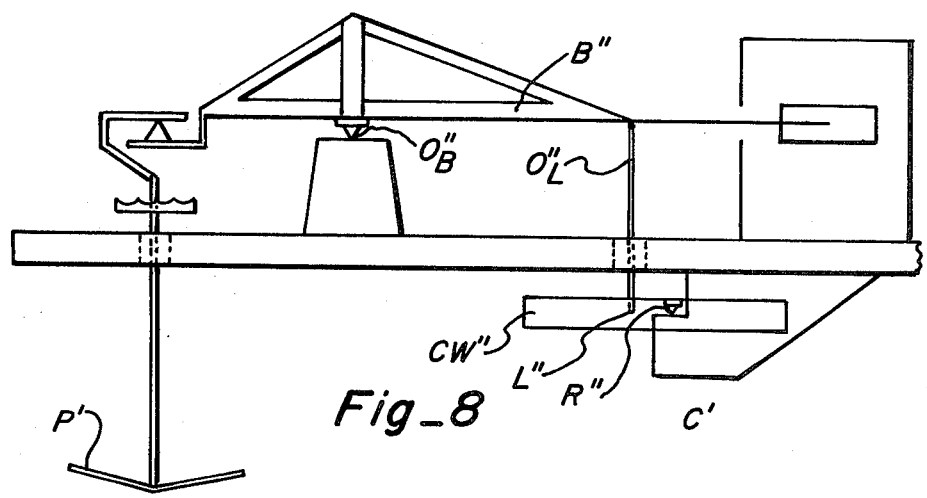
Fig_8

APPARATUS FOR NULLIFYING THE EFFECTS OF ANGULAR ACCELERATION OF FRAMES TILTABLY MOUNTING BALANCE BEAMS AND THE LIKE

This application is a continuation of application Ser. No. 538,114, filed Jan. 2, 1975, now abandoned, which application is, in turn, a continuation-in-part of application Ser. No. 472,660 filed May 3, 1944, now abandoned.

The ordinary beam balance is subject to a multitude of error-producing factors that have a detectable effect upon its ability to make accurate weighings; and, for the most parts, the more sensitive the balance, the greater the influence these error-producing factors have upon it. Needless to say, the elimination of these errors has occupied the attention of many skilled scientists for centuries.

These error-producing factors can be considered as falling into two categories, the first of which relates to the mechanism itself and includes such things as friction, parralax, physical characteristics of the components, wear, geometry of the system, capacity, range, etc. The second category, on the other hand, deals with error-producing factors external to the system and it is to a solution for a problem of the latter type that the instant invention relates. Included among the error-producing factors in this second category are such things as air currents, temperature, humidity, pollutants, characteristics of the sample, static electricity, magnetism and, probably most significant of all, vibration.

The prior art attempts at eliminating the error-producing effects of vibration can be further subdivided into two subclasses, namely, those designed to prevent the vibrations from ever reaching the system and those intended to eliminate or compensate for those that do get through. In the first subclass we find such selfevident solutions as selecting a location for the unit which has a relatively stable environment. Add to this mounting of the unit upon a massive base and one will have done about as much as can be done to isolate the unit from outside influences of this type. In the second subclass, the most common approach to the reduction or elimination of the vibratory forces that do get through to the system is some sort of filter.

Filters provide quite an effective way of nullifying the effect of error-producing vibrations, however, in so doing, they introduce certain serious complications which, to a large measure, offset their advantages. Probably one of the most serious disadvantages is that of slowing down the time interval that it takes to complete a weighing. The reason for this is that the filtering mechanism must, of necessity, be able to discriminate between a unidirectional force represented by the mass being weighed and the reversible cyclic forces produced by vibrations that are to be ignored. In other words, any functionally adequate filtration system must include some means for distinguishing between those forces acting upon the system that must be included within the final reading and those that are to be eliminated therefrom. Practically speaking, it is the change in the direction of the unwanted forces that can be sensed most easily and which provide the best and most reliable clue to those that should be ignored. Unfortunately, to do this, a time interval must be allowed to elapse during which any and all of the unwanted error-producing vibratory forces will surely have had an opportunity to change direction. This, of course, slows down the weighing procedure appreciably and is a serious disadvantage in many applications.

The unfiltered system is unstable under the influence of vibratory forces and, to whatever extent the case or frame supporting the beam is angularly accelerating relative thereto under the influence of such forces, the output or reading will fluctuate. This is most easily understood in terms of a balance beam which reaches a state of equilibrium at some angle relative to its supporting structure that bears a known relationship to the mass of the sample being weighed. In the simplest form, the beam is provided with a pointer that sweeps across a calibrated scale on the frame thus providing a visual indication of the weight of the unknown mass. If, however, external angularly-directed inertial forces are at work on the beam supporting structure tending to angularly-accelerate same relative to the beam itself which, because of its inertia, tends to remain stationary in space, then the pointer is going to fluctuate from side-to-side on the scale in direct proportion to the magnitude of such inertial forces.

In fact, all beam-type balances function on the principle of measuring the position of the beam relative to the frame supporting it as in the simple example just given. For instance, in a deflection type balance like that of the foregoing example, the tilt of the beam relative to its frame or support is measured and provides a direct indication of the weight of the unknown mass. Conversely, in what is known as a "virtual motion type balance", the beam actually remains in, or is at least restored to, a fixed position relative to its support while the force required to keep it there is measured and provides the indication of weight of the unknown mass. Thus, in all beam-type balances, the frame mounting the beam moves in response to angularly-directed inertial forces transmitted to it from the support upon which the frame rests while the beam itself tends to remain stationary in space due to its inertia. The ultimate effect of this angular acceleration of the frame tiltably supporting the beam relative to the beam itself is, as previously mentioned, to produce an unstable condition that is reflected in a fluctuating output or reading.

It has now been found in accordance with the teaching of the instant invention that this serious problem of angular acceleration of the beam-supporting framework relative to the beam carried thereby can effectively be eliminated by the simple, yet unobvious, expedient of suspending a counterweight on parallel legs of a suspension system between the beam and frame in such a manner that it is instantly effective to counteract any such external angularly-directed inertial forces reaching the system. The resultant system not only negates the error-producing effect of such forces but, at the same time, does so instantaneously and without having to wait to see if they change direction. As such, the frequency at which weighings can be made is limited only by the design of the balance itself without reference to the cooperating mechanism by means of which the vibrational forces tending to angularly accelerate the frame relative to the beam are neutralized and eliminated.

While actual application of the concept forming the subject matter of my abandoned application previously identified proved somewhat successful, it failed in practice to produce anywhere near the results that were theoretically possible. Subsequent re-examination of my calculations has revealed that they contained two significant errors which, once corrected, materially altered the position of the counterweight suspension points relative to one another and to its center of mass. The first of these had to do with the erroneous assumption on my part that the effect of angular acceleration of the counterweight was such as to act downwardly when, in actuality, the net effect is to elevate its center of mass when the adjacent end of the beam rises and causes the counterweight to climb up the fixed limb of its suspension sytem. Also, I mistakedly left out altogether a term which reflected the effect upon the system due to vertical translation of the counterweight.

In my previous attempt to reduce these mathematical relationships to a concrete physical form, the system performed much as I had anticipated that it would except for the fact that the magnitude of improvement my calculations had led me to believe could be attained was by no means reached. For some time I attributed these somewhat disappointing results to the fact that I had modified an existing balance rather than tailoring an overall design to take advantage of my newly-discovered concept when, in reality, the errors in my calculations resulted in the counterweight suspension points being displaced a fraction of an inch from their optimum positions, whereupon, the results failed to achieve my expectations.

I have now found in accordance with the teaching of the instant invention that correcting these two mathematical errors and suspending the counterweight from the suspension points thus relocated has, in fact, made it possible to construct a balance wherein the actual reduction in the effects of angular acceleration on the balance beam closely approximate those which I determined were theoretically attainable. Thus, while the basic concept expressed in my abandoned copending application remains as valid as it ever was, the mathematics which determined the points of suspension for the counterweight were erroneous and need to be corrected so that the advantages inherent in my invention can be realized to their fullest extent.

Completely apart from these errors, I have also recently discovered that the center of mass of the counterweight needn't necessarily, be located halfway between its points of suspension, i.e. at the counterweight's center of gravity but, in actuality, the location of the counterweight cg can be displaced horizontally nearer to one suspension point than the other. In fact, surprisingly, the cg of the counterweight can even lie above or below the straight line defined by the suspension points provided that an offsetting displacement of the center of mass of the beam off the line defined by the axis of rockable movement thereof and the suspension point of the pan is introduced into the system. While there is no advantage whatsoever in doing this, nevertheless, it can be done without changing the nullifying effect of the counterweight upon angular acceleration forces contrary to my earlier thinking.

It is, therefore, the principal object of the present invention to provide a novel and further improved mechanism operative upon connection to the beam of a beam balance or other fulcrum-mounted lever system to eliminate the error-producing effect of vibratory forces acting to angularly accelerate the supporting framework therefor.

A second objective of the within described invention is the provision of an apparatus for negating angularly-directed inertial forces acting on a balance beam or the like due to vibration by instantaneously inducing a counterbalancing force therein of the same magnitude effective to cancel same.

Another object is the provision of a system for the elimination of those error-producing angular vibrational forces that operate upon the beam of a beam balance or similar system that is independent of the time interval required for such forces to change direction.

Still another objective of the invention herein disclosed and claimed is to provide an apparatus of the type aforementioned which requires no filters or associated discriminator operative to distinguish between the forces derived from the mass being weighed and those error-producing forces to be ignored.

An additional objective of the invention is the provision of an apparatus of the type aforementioned which, while primarily designed to null the error-producing effects of angular acceleration forces on the beams of beam balances, is also equally effective to negate the unwanted consequences arising from the presence of such forces in other fulcrum-mounted lever system such as, for example, phonograph arms, cargo loading booms and the like.

Further objects of the invention forming the subject matter hereof are to provide an error-nulling apparatus for fulcrum-mounted lever arm systems subject to angular vibratory motion that is relatively simple, sensitive, versatile, compact and readily integratable into such systems so as to remain compatible therewith.

Other objects will be in part apparent and in part pointed out specifically hereinafter in connection with the description of the drawings that follows, and in which:

FIG. 1 is a diagram of a conventional double-pan beam balance illustrating the linear acceleration forces acting thereon due to vibration;

FIG. 2 is a diagram illustrating the moments acting about the fulcrum of a typical substitution balance beam;

FIG. 3 is a diagram illustrating the vertical translation of the frame tiltably mounting a typical beam balance due to the angular acceleration of the supporting surface upon which it rests;

FIG. 4 is a schematic diagram showing the suspension of a "Yo-Yo type" counterweight between beam and beam-supporting frame of a beam balance;

FIG. 5 is a schematic diagram similar to FIG. 4 except that the Yo-Yo type counterbalance system has been replaced by fulcrum-mounted counterweight hanging from a single stirrup;

FIG. 6 is a schematic diagram to FIGS. 4 and 5 but differing therefrom in that an irregular mass is used as the counterweight and its center of mass no longer lies halfway between its points of suspension;

FIG. 7 is a force diagram showing the application of the invention to the balance of FIG. 8; and, FIG. 8 is a simplified representation of an actual balance modified in accordance with the present invention.

Referring next to the drawings for a detailed description of the present invention and, initially, to the diagram of FIG. 1 for this purpose, the letter B represents the beam of a simple two-pan balance having pans P suspended by means of stirrups S from the opposite ends thereof. The beam configuration is such that its centroid is located very near the axis of rotation of the center knife edge that defines the fulcrum O about which it rocks. In the deflection type balance shown in the diagram, the centroid must be located a short distance underneath the knife edge for proper stability; however, in an electronic null type balance, the centroid of the beam may be located precisely at the fulcrum 0. In either case, the balance operation is one of summing moments about fulcrum O, i.e., a weight (W) in one of the pans (P) produces a moment equal to the product of the weight and the length of that portion of the lever arm (l) on the same side of the fulcrum.

Now, if the beam is balanced and the centroid of the beam lies precisely on the axis of tiltable movement defined by fulcrum O, no linear acceleration component that acts vertically ($a_r$), i.e., perpendicular to the axis of tiltable movement or horizontally, i.e., at right angles to said axis ($a_x$) or parallel thereto, ($a_y$) will produce a moment about the latter. Thus, the stability of the balance reading remains unaffected by any of the foregoing linear acceleration components or any combination thereof. Using a configuration like that illustrated in the diagram of FIG. 1, therefore, a beam weighing several hundred grams can be used to make weighings in the microgram region without being affected by linear acceleration of the frame supporting same vertically or in a horizontal plane.

Angular acceleration of the supporting frame mounting the beam B is, however, another story because the balance beam does have inertia and, for this reason, it tends to remain stationary in space independent of rotation of the frame. The diagram of FIG. 2 to which reference will now be made is illustrative of a balance beam B having parameters characteristic of those found in a conventional substitution balance.

The inertia of this simplified beam system ($I_B$) about the axis of tiltable movement thereof defined by fulcrum O can be stated mathematically as follows:
Equation (1)

$$I_B = M_1 l_1^2 + M_2 l_2^2 = 45 \text{ gm. cm. sec.}^2$$
where $l_1 = 7$ cm.

$l_2 = 14$ cm.

$M_1 g = 300$ grams $M_2 g = 150$ grams

The beam moment created by angular acceleration ($\alpha$) is:
Equation (2)
$$M = I_B \alpha$$
where $\alpha$ is the angular acceleration in radians/sec.$^2$ Now, if the beam moment induced by a pan weight of, say, one milligram is made equivalent to the moment due to a particular angular acceleration ($\alpha_\epsilon$), then this angular acceleration can be calculated as follows:
Equation (3)

$$\alpha_\epsilon = \frac{M}{I_B} = \frac{(1 \times 10^{-3} \text{ gm})(7 \text{ cm})}{45 \text{ gm cm sec}^2} = 1.55 \times 10^{-4} \text{ rad/sec}^2$$

This is the amount of angular acceleration required to produce a $\pm 1$ mg. variation in the balance reading. This amount of angular acceleration is somewhat difficult to comprehend, however, it can be made more meaningful if it is related to frequency and displacement which can easily be done by means of FIG. 3 to which detailed reference will now be made.

FIG. 3 is intended to represent a right end view of a typical balance case C resting atop a vibrating supporting surface or table T. Case C, of course, comprises a part of the beam-supporting framework and any angularly-directed inertial forces effecting it result in the type of relative angular acceleration between the beam and the frame mounting same that the instant invention eliminates. If the table is undergoing angular acceleration ($\alpha_\epsilon$), the vertical displacement of the rear balance feet (m) can be calculated as follows assuming a 60 cycle frequency of vibration which is common to many locations where machinery is being operated from a 60 cycle source of electric power:
Equation (4)
$$\alpha_\epsilon = 1.55 \times 10^{-4} \text{ in } 120\pi \text{st}$$

The angular velocity:
Equation (5)

$$\omega_\epsilon = \int \alpha_\epsilon \, dt = \frac{-1.55 \times 10^{-4}}{120\pi} \cos 120\pi t$$

And the angular position:
Equation (6)

$$\theta_\epsilon = \int \omega_\epsilon \, dt = \frac{-1.55 \times 10^{-4}}{(120\pi)^2} \sin 120\pi t$$

The amplitude of the vertical translation of the balance feet is, therefore:
Equation (7)

$$X = D |\theta_\epsilon| = 6 \left(\frac{1.55 \times 10^{-4}}{(377)^2}\right) \approx 6 \times 10^{-9} \text{ inches}$$

Even when the output of the balance is filtered through a first order filter having a band pass of 0.6 cycle/sec., the vertical translation of the balance required to produce a $\pm 1$ milligram output flutter is $$X = \frac{1.55 \times 10^{-2}}{(377)^2} \approx 6 \times 10^{-7} \text{ inches}$$

Equation (8)

Obviously, from equations 7 and 8, it becomes quite apparent that the angular acceleration components of vibratory forces having an order of magnitude so small as to seem inconsequential have a pronounced effect upon the balance output even using a first order filter.

With the foregoing as background information on the general problem of the effect that the angular acceleration components of vibratory motion have upon fulcrum-mounted lever arms of one type or another, references will now be made to FIG. 4 wherein a solution to the problem has been illustrated diagrammatically in accordance with the teaching of the instant invention.

In FIG. 4, a single-pan counterweighted beam balance has been illustrated diagrammatically wherein the counterweight (CW) has a Yo-Yo like configuration and is suspended by a flexible tape (Q) between the Beam (B) and the framework tiltably mounting said beam that is represented by the letter "C". Element C comprises a part of the frame mounting the beam and it responds to the angular acceleration components of vibratory motion in the manner previously set forth in connection with the diagram of FIG. 3 and, as it does so, there is a relative motion between the space oriented beam and said framework unless the inertial forces on the beam are otherwise counteracted.

The Yo-Yo like counterweight (CW) can take any one of several forms and still function perfectly well for its intended purpose, the main criteria being that it be suspended for rotation about a frame oriented axis parallels the axis of tiltable movement of the beam ($O_B$). The counterweght (CW) must not be pendulous with reference to its axis of rotation because pendulosity would result in an unwanted counterweight torque due to lateral acceleration.

Of equal importance is the relationship of the tape Q, and particularly the right-hand and left-hand limbs ($Q_R$ and $Q_L$) thereof, to the counterweight (CW). The groove (G) in the counterweight lies in a plane normal to the axis of tiltable movement of the beam ($O_B$). The groove is circular about the axis of rotation of the counterweight and has a radius $R_1$. The points of attachment of the right and left-hand limbs of the tape to the frame and beam, respectively, are selected such that these legs hang down vertically. This means, of course, that their points of tangency (R and L) with the groove (G) lie spaced apart on a horizontal line passing through the axis of rotation and having a length $2R_1$ in all angular positions of the counterweight. $R_1$, therefore, becomes the horizontal distance from the axis of rotation (Ocg) of the counterweight (CW) out to one of the points of tangency R or L and this distance must remain the same in all angular positions of the counterweight also.

By counterbalancing the beam (B) with a Yo-Yo counterweight suspended on a tape (Q) as diagrammed, the moments due to angular accelertion can be instantaneously cancelled in the following manner. First, the sum of the moments around the fulcrum O can be expressed mathematically as follows:

For static equilibrium:
Equation (9)
$$\Sigma M_o = 0 = M_P g R_3 - \tfrac{1}{2} M_{cw} g R_4$$

This Equation describes the equilibrium condition for the simplified beam system of FIG. 4. It is understood that actual balance systems are more complex but that the Yo-Yo counterweight principle is still applicable. Or, $$M_P = M_{cw} \frac{R_4}{2R_3}$$

where:
$M_P$ is the mass of the pan, substitution weights, etc.
$M_{cw}$ is the mass of the counterweight yo-yo
$g$ is the acceleration of gravity When the balance case is angularly accelerated an amount ($\alpha$), the force ($F_1$) which is always downward, must decrease by an amount ($\Delta F_1$) as necessary to angularly accelerate the beam by the same amount ($\alpha$). So:

Equation (10)
$$\Delta F_1 \cdot R_4 = I_B \alpha$$

Equation (11)
$$\Delta F_1 = I_B \alpha / R_4$$

The counterweight must be angularly accelerated by the same amount ($\alpha$) by the sum of the forces $\Delta F_1$ and $\alpha F_2$ so that:
Equation (12)
$$(\Delta F_2 + \Delta F_1) R_1 = I_{cw} \alpha$$
where:

$I_{cw}$ is the inertia of the counterweight about its centroid

Now the centroid of the counterweight must be linearly accelerated by the difference of the forces $\Delta F_2$ and $\Delta F_1$ such that:
Equation (13)
$$\Delta F_2 - \Delta F_1 = M_{cw} A_v$$
where:
$M_{cw}$ is the mass of the counterweight
$A_v$ is the vertical acceleration of the centroid The vertical acceleration $A_v$ can be expressed in terms of the angular acceleration ($\alpha$) as:
Equation (14)
$$A_v = (R_4 + R_1)\alpha$$

By combining equations 6, 7 and 8 we have:
Equation (15)

$$\Delta F_1 = \frac{I_{cw}\alpha}{2R_1} - \frac{M_{cw}(R_4 + R_1)\alpha}{2}$$

and by combining equations 9 and 5, we obtain the following equation:
Equation (16)

$$\frac{I_B}{R_4} = \frac{I_{cw}}{2R_1} - \frac{M_{cw} R_4}{2} - \frac{M_{cw} R_1}{2}$$

It should be understood that Equation (16) is valid only for the simplified beam of FIG. 4. For actual balance configurations it will be necessary to account for total beam inertial.

By simplifying Equation (16) through substitution of the values taken from Equation (9) we have the following equation representing the characteristics of the counterweight (CW) necessary to counteract the error-producing angular acceleration component in the beam:
Equation (17)

$$R_3 = \frac{R_2^2 - 2R_1 R_4 - 2R_1^2}{2R_1}$$

Thus, if the Yo-Yo counterweight is designed to that its major and minor radii ($R_2$ and $R_1$) are related to the balance beam lengths ($R_3$ and $R_4$) as indicated in Equation (17), the beam moment due to angular acceleration will be completely cancelled.

The sensitivity of a beam balance to angular acceleration is directly proportional to the ratio of beam system inertia divided by the resolution of the balance. That is to say, angular acceleration will have a pronounced effect upon the stability of a balance with a massive beam that is capable of reading in the microgram region while it may not be noticeable in a balance with a low inertia beam sensitive only to a tenth of a gram.

The Yo-Yo counterbalance will, due to certain fixed errors require correction, however, adjustments can be made to compensate therefor, either by trial and error or by introducing a correction factor thus providing perfect correction with the beam system in equilibrium, i.e., no weight on the pan. In the case where a Yo-Yo counterbalance is used and a weight on the pan is electromechanically offset, the Yo-Yo will compensate for angular acceleration of the beam system but not for the added weight of the unknown. The residual effect of angular acceleration in this case is proportional to the mass of the unknown and the square of the length of the beam between the pan knife edge and the main knife edge.

In a typical substitution balance, the inertia of the beam system would be in the order of 30 gm. cm. sec.$^2$. The effective inertia of the largest unbalanced weight to be used on this balance, on the other hand, would be approximately 0.05 gm. cm. sec.$^2$. In the absence of the angular acceleration correction mechanism of the present invention, the angularly-directed inertial forces would act upon the entire inertia of the beam system i.e., 30 gm. cm. sec.$^2$; however, with such a mechanism included, they act only upon the largest weight which remains uncompensated for thus making a correction factor approaching 1000 to 1 possible.

Now, the single-pan tiltable beam configuration of FIG. 4 is ideally suited for use with the tape-suspended Yo-Yo counterweight as the latter functions just as well with the beam tilted as it does with it horizontal. The friction between the Yo-Yo and the tape will, in all probability, however, be of sufficient magnitude to render such a counterbalance system unsuitable for accurate weighings of less than a milligram or so. Fortunately, most modern balances do not use a tiltable beam, but instead, a stationary one ike that illustrated diagrammatically in FIG. 5.

Now, at first glance, the FIG. 5 system seems entirely different than that of FIG. 4 in that the modified counterweight (CW') does not rotate about an axis through its center of mass (cg') but instead, it merely tilts about the fulcrums (R' and L') contained within the confines thereof and which are supported by stirrup $Q'_L$ and frame C. In reality, however, the counterweight (CW') of FIG. 5 and its method of suspension between the beam (B') and frame (C) is nothing more than a special adaptation of the FIG. 4 concept applicable only to the so-called virtual motion type balance previously described and represented diagrammatically here by a coil (G) carried by the beam (B') and a magnet (H) adapted to restore the beam to its equilibrium position upon the application of currents thereto which are proportional to the load of the unknown mass on the pan P. The reason for this is that if, in fact, counterweight (CW') were allowed to tilt, fulcrums (R' and L') would no longer lie on a horizontal line and the resolution of these points (R' and L') back onto a horizontal line would result in their being closer together than $2R_1$ which condition must be present as has already been mentioned. Accordingly, in the virtual motion system of FIG. 5 where, for all practical purposes, the beam does not move, then suspension points (R' and L') stay the same distance apart ($2R_1$) and spaced equidistant on opposite sides of the axis of rotation paralleling the axis of tiltable movement ($O'_B$) of the beam that passes through the center of mass (cg'). The single remaining stirrup ($Q'_L$) hangs vertically just like its counterpart $Q_L$ in the flexible tape system of FIG. 4 and were it not for the friction problems created by such a connection, one or both of these stirrups could be replaced by lengths of flexible tape or cord permanently attached where the knife-edge fulcrums (R' and L') have been shown in the diagram.

In FIG. 5, fulcrum (R') becomes an instantaneous center of rotation ($O'_R$). By, once again, figuring the forces $F_1$ and $F_2$ acting at points ($X_1$ and $X_2$) on the stirrups ($Q_R$ and $Q_L$), it will immediately become apparent that the exact same conditions are present that have already been described in detail in connection with FIG. 4. The summation of the moments about the axis of tiltable movement ($O'_B$) still remain as expressed mathematically by Equation 9. Equations 10 through 16, on the other hand, are still valid insofar as expressing the dynamic equilibrium that exists in the system.

Next, with specific reference to FIG. 6, the theories advanced with respect to the regularly-shaped counterweights of FIGS. 4 and 5 will be re-examined with respect to the more general case of an irregular counterbalancing mass to show that they still remain valid. Following this, a general set of relationships applicable to any shape of counterweight coacting with a fulcrum-mounted beam system to null the reversible angular accelerating forces acting thereon can be developed.

If we look at the beam of FIG. 6, its inertia ($I_B$) can be shown to be the sum of mass of each particle of the beam ($dm_b$) times the square of its distance from the fulcrum or axis of tiltable movement 0. This can then be expressed as the surface integral ($\phi$) thus:
Equation (18)
$$I_B = \phi \gamma_b{}^2 \, dm_b$$

Therefore, regardless of how complex the beam itself is or the various factors that must be taken into consideration in determining its total inertia, the preceding surface integral correctly expresses same.

Now, the inertia of the counterweight ($I_{cw}$) about an axis passing through its center of gravity can be expressed mathematically as the sum of the mass of each particle ($dm_{cw}$) times the square of its distance from the centroid ($R_{cw}$) and is thus stated as a surface integral in the following form:
Equation (19)
$$I_{cw} = \phi R_{cw}{}^2 \, dm_{cw}$$

In accordance with the teaching of the present invention, however, the counterweight does not rotate about an axis passing through its centroid ($\gamma_{cw}$), but instead, about an instantaneous axis of rotation parallel to the axis of tiltable movement of the beam that is displaced from said centroid by the shortest straight line (perpendicular) distance $R_o$.

This shift in the axis of rotation is accounted for in equations (12) through (16) for the case where the center of gravity of the counterweight ($\gamma_{cw}$) is equally spaced between the counterweight suspension points R and L.

Examining the forces on the counterweight ($F_1$ and $F_2$) for equilibrium, we have:
Equation (20)
$$F_1 + F_2 = M_{cw}{}^a$$
where:
$M_{cw}$ = mass of counterweight
$g$ = acceleration of gravity
Equation (21)
$$F_1 R_1 = F_2 R_0$$

Now by combining equations (20) and (21) we have:
Equation (22)

$$F_1 = \frac{M_{cw} \, g \, R_0}{R_0 + R_1}$$

For static equilibrium of the beam:
Equation (23)

$$M_\nu \cdot g \, R_3 = \frac{M_{cw} \, g \, R_0 \, R_4}{R_0 + R_1}$$

From equation (23) it is obvious that the system of FIG. 6 is not torqued by vertical acceleration since the gravity term (g) divides out of the moment equation. It is evident from FIG. 6 that lateral acceleration will not torque the system provided that the center of gravity of the counterweight and of the beam are carefully located with respect to the corresponding knife edges.

If the beam is to follow an angular acceleration ($\alpha$) of the case, the force $\Delta F_1$ necessary in the suspension tape is:

Equation (24)
$$\Delta F_1 \cdot R_4 = I_B \alpha \text{ or}$$
where $I_B$ is the inertia of the beam system $$\Delta F_1 = \frac{I_B \alpha}{R_4}$$

If the counterweight is to follow the angular acceleration ($\alpha$) of the case, two additional conditions must be met:

Equation (25)
$$\Delta F_1 R_1 + \Delta F_2 R_0 = I_{cw} \alpha$$
wherein:
$I_{cw}$ is the inertia of the counterweight
and,
$M_{cw}$ is the mass of the counterweight Equation (26)
$$\Delta F_2 - \Delta F_1 = M_{cw} (R_4 + R_1) \alpha$$

By combining equations (24), (25) and (26) we arrive at a more general application equation that allows for the situation where the center of gravity of the counterweight is not necessarily at the midpoint of the line between the two attachment points:

Equation (27)
$$I_{cw} R_4 = I_B (R_1 + R_0) + M_{cw} R_0 R_4 (R_1 + R_4)$$

By substituting ($R_1 = R_0$) into equation (8) we can reduce it to:

Equation (28)
$$\frac{I_B}{R_4} = \frac{I_{cw}}{2R_1} - \frac{M_{cw}(R_1 + R_4)}{2}$$

Equation (28) is in agreement with that derived in equation (16) which represents the special case where the center of gravity is at the midpoint between the attachment points.

Having explored the general case exemplified by FIG. 6, we are now in a position to identify those relationships necessary in any offsetting inertial mass and the suspension system supporting same between the beam and frame that will be effective to cancel such errors in the readout as are occasioned by instability resulting from relative angular movement between the frame and beam. For this purpose, detailed reference will continue to be made to the diagram of FIG. 6 wherein these relationships are revealed in their most general terms.

To begin with, the counterweight (CW) is partly suspended by the beam (B) and partly by the frame (C). Attachment points L and R should be on a common line with the center of gravity of the counterweight. The center of mass ($\gamma_{cw}$), on the other hand, must bisect the attachment points for other than virtual motion systems, otherwise, various system positions will produce unwanted pendulous conditions.

Now, it can be shown that when the distance from the center of mass ($\gamma_{cw}$) to the frame attachment point (R) equals the radius of gyration ($R_G$) of the mass (CW), then relative angular acceleration of the frame (C) with respect to the beam (B) will have no effect whatsoever upon the latter. Furthermore, if the minor dimension ($R_0$) exceeds the radius of gyration ($R_G$) of mass (CW), then the effect of angular acceleration of the frame (C) relative to the beam (B) will be such as to increase rather than reduce its unstabilizing effect upon the latter. Accordingly, the minor dimension ($R_0$) of the counterweight (CW) must be less than its radius of gyration ($R_G$).

The manner in which the counterweight (CW) is suspended between the beam and frame is, of course, important. The above relationship between the dimension ($R_0$) and the radius of gyration of the counterweight is valid when both counterweight attachment points (L and R) are on the same side of the central knife edge of the beam. For the case where one counterweight attachment point (say L) is on one side of the fulcrum (O) and the other attachment point (R) is on the other side of fulcrum (O) the minor dimension ($R_0$) must exceed the radius of gyration of the counterweight (CW).

In all instances, beam rotation will bring about a corresponding rotation of the counterweight about an instantaneous axis of rotation ($O_R$) within the interior of the mass that is:
1. Fixed relative to the frame (C);
2. Parallel to the axis of tiltable movement of the beam ($O_B$); and,
3. At a perpendicular distance ($R_0$) from the center of mass ($\gamma_{cw}$).

Last, but by no means least, the beam inertia must be related to the counterweight inertia according to the general equation (27) which must be modified for different attachment configurations as outlined above.

In FIGS. 7 and 8 to which reference will now be made, the significant structural features of an actual balance have been shown in two different forms, FIG. 7 being a force diagram while FIG. 8 is a schematic. The particular balance used was a Mettler Model HE-10 substitution balance which was modified and fitted with the apparatus forming the subject matter of the present invention in order to evaluate the theories advanced previously. The balance in question is an electronic null-restoring type unit with a capacity of 160 grams and a sensitivity of 0.0001 grams. The counterweight CW'' had an assymetrical configuration as shown and was connected to a point on the beam on the opposite side of its axis of the tiltable movement $O''_B$ by a thin (0.001 inch) stainless steel tape $O''_L$. The frame reference for the counterweight was via a sapphire knife edge R'' mounted on the counterweight CW'' that was positioned upon a flat sapphire bearing block C' that comprises an element of the main frame.

In order to determine the size of the counterweight CW'', it was first necessary to calculate the inertial parameters of the unit which was done as follows, not all of the elements having been shown in either figure:

| Ass'y Description | Ass'y Weight | Ass'y Inertial |
|---|---|---|
| Pan, stirrup ass'y., weight hanger ass'y., and weights | 262.3 gms. | 13.10 gm. cm. sec.² |
| Aluminum position flag | 3.55 | 0.29 |
| Coil assembly | 13.68 | 2.03 |
| Rear arrestment bar | 17.7 | 1.80 |
| Beam Structure remaining | 62.6 | 2.25 |
| | Total Beam Inertia - | 19.47 gm. cm. sec.² |

In FIG. 7, it will be apparent that, while the center of gravity (cg″) of the counterweight CW″ lies on the line interconnecting the two attachment points L″ and R″, it is no longer midway therebetween so the $R'_0$ does not equal $R'_1$ as was true before. Instead, $R'_1$ is considerably longer than $R'_0$.

In the foregoing calculation of total beam inertia, no term was included for the conventional beam counterweight (not shown) which was done away with entirely. Now, in order to establish a state of static equilibrium with the standard counterweight removed, it became necessary to construct the counterweight CW″ such that the static force in the tape $Q''_L$ was equal to 200 grams. Since it is highly desirable to utilize as large a spacing as practicable between L″ and R″, brass was used as the materials from which the counterweight was fabricated and it had a total mass ($M_{cw}$) of 0.75 gm. sec.²/cm. Using this figure for $M_{cw}$ along with the aforementioned 200 gram static force requirement, Equation 22 can be used to determine the spacing between the points of attachment to the counterweight L″ and R″ and, more particularly, the distances along line L″ R″ to the cg″, namely, $R'_0$ and $R'_1$, as follows:

$$F_1 = \frac{(M_{cw}) g R_0}{R_1 + R_0}$$

where $F_1$ = the static tape force of 200 gas.
$M_{cw}$ = the mass of CW″ or 0.75 gm. sec.²/cm.
$g$ 32 acceleration of gravity at 981 cm/sec.²
Simplifying the above equation using the values stated, $$R_1 = 2.68 R_2$$

The counterweight CW″ had a more or less square figure 8 shape and its inertia was calculated by subdividing it into a plurality of right parallelepipeds and then combining the inertias of the several subdivisions This procedure yielded a total counterweight inertia of:

$$I_{cw}'' = 16.32 \text{ gm. cm. sec.}^2$$

Now, by substituting the above parameters into the general counterweight application equation (Equation 27), it becomes possible to evaluate the location of points L″ and R″ with respect to the centroid (cg″) of CW″, as follows:
Equation (27)
$$I_{cw} R_4 = I_B (R_0 + R_1) + M_{cw} R_0 R_4 (R_1 + R_4)$$

The following values were used in the above equation:

$$I_{cw} = 16.32 \text{ gm. cm. sec.}^2$$

$$I_B = 19.47 \text{ gm. cm. sec.}^2$$

$$M_{cw} = 0.75 \text{ gm. sec.}^2/\text{cm.}$$

$$R_4 = 6.8 \text{ cm.}$$

$$R_1 = 2.68 R_0$$

This Equation (27) reduces to:
$$R_0^2 + 7.78 R_0 - 8.12 = 0$$

or,
$$R_0 = 0.932 \text{ cm.}$$

and,
$$R_1 = 2.68 R_0 = 2.498 \text{ cm.}$$

A squared figure-8 configuration counterweight was fabricated with attachment point spacing fixed according to the above calculations for $R_1$ and $R_0$. It was installed in a Mettler Model HE-10 electronic substitution balance and the following tests were conducted.

The balance thus modified was mounted on an angular vibration table along with another standard model HE-10 unit for comparison purposes. The angular vibration table was specially designed to rotate each balance about an axis coincident with the forward (pan supporting) knife edge so as to isolate beam inertial forces from small, yet measurable, pan swing forces. The angular vibration table was drawn by a variable speed motor using an adjustable travel crank and connecting rod. Tests were conducted at several different frequencies between zero and ten radians/sec at different amplitudes. In all cases, the amplitude of the output acceleration of the compensated balance as here measured at the units analog output terminal, was reduced by a factor between 100 and 1000 with respect to that of the uncompensated balance.

No attempt was made to tune the counterweight parameters to better the correction ratio; however, it can be assumed that the calculated parameters are not perfect and hence even larger correction factors are possible.

What is claimed is:
1. In a device that includes a rigid frame supporting a beam for tiltable movement about a horizontal axis displaced to one side of its centroid a distance effective to produce a condition of substantial imbalance therein, the improved means for counteracting those inertial forces tending to angularly accelerate one of said elements relative to the other which comprises: a counterweight sized to offset the condition of imbalance in the beam and restore same to an equilibrium position under static no-load conditions mounted upon the frame for tiltable movement about an instantaneous axis of rotation paralleling the axis of tiltable movement of the beam and spaced to one side of said counterweight's centroid a distance less than the radius of gyration of said counterweight; and, hanger means operatively connecting said beam and counterweight together for coordinated tiltable movement relative to one another and to the frame, the points of attachment of said hanger means to said counterweight and to said beam being spaced from their respective axes of pivotal movement distances effective to cooperate with the mass of said counterweight, the direction said counterweight tilts relative to the beam and the inertias of said beam and counterweight about their respective centroids so as to nullify substantially all relative motion between said beam and frame occasioned by inertial forces operative to bring about angular acceleration of the latter.

2. The improvement as set forth in claim 1 wherein the point of attachment of the hanger means to the counterweight lies on the opposite side of the centroid thereof from its axis of tiltable movement.

3. The improvement as set forth in claim 1 wherein the point of attachment of the hanger means to the beam lies on the same side of the centroid thereof as its axis of tiltable movement.

4. The improvement as set forth in claim 1 wherein the axes of tiltable movement of the beam and counterweight are displaced to one side of their respective centroid so as to define parallel planes.

5. The improvement as set forth in claim 1 wherein the beam and counterweight lie in superimposed relation one above the other; and, in which the points of attachment between the hanger means and said beam and counterweight lie in vertically-spaced relation to one another.

6. The improvement as set forth in claim 1 wherein the point of attachment of the hanger means to the counterweight lies inside the circle defined by the radius of gyration of the latter.

7. The improvement as set forth in claim 1 wherein the centroid of the counterweight together with its axis of tiltable movement and point of attachment to the hanger means are coplanar.

8. The improvement as set forth in claim 1 wherein the hanger means comprises a flexible essentially non-elastic tape.

9. The improvement as set forth in claim 1 wherein the hanger means comprises a rigid stirrup; and, in which the points of attachment between said stirrup and beam and counterweight are defined by knife-edge bearing blocks.

10. The improvement as set forth in claim 1 wherein the counterweight tilts in a direction opposite to that of the beam.

11. The improvement as set forth in claim 1 wherein the axis of tiltable movement of the counterweight comprises a knifeedge bearing.

12. The improvement as set forth in claim 11 wherein the hanger means comprises a flexible tape which will not elongate appreciably under load.

13. The improvement as set forth in claim 1 in which:

$$I_{cw}R_4 = I_B (R_0+R_1) + M_{cw}R_0R_4(R_1R_4)$$

where $I_{cw}$ is the inertia of the counterweight about its centroid, $I_B$ is the inertia of the beam system about its centroid, $M_{cw}$ is the mass of the counterweight, $R_4$ is the distance separating the axis of tiltable movement of the beam from its point of attachment to the hanger means, $R_0$ is the distance separating the axis of tiltable movement of the counterweight from its centroid, and $R_1$ is the distance separating the centroid of the counterweight from its point of attachment to the hanger means.

14. The improvement as set forth in claim 2 wherein: $R_0 = R_1$.

15. The improvement as set forth in claim 2 wherein: $R_0 < R_1$.

16. The improvement as set forth in claim 1 wherein both the axis of tiltable movement of the counterweight and its point of attachment to the hanger means lie inside the circle defined by said counterweight's radius of gyration.

17. The improvement as set forth in claim 16 wherein the counterweight comprises a cylinder having openings on both sides thereof within which are located its axis of tiltable movement and the point of attachment of the hanger means thereto.

18. The improvement as set forth in claim 17 wherein the counterweight has a Yo-Yo type configuration.

19. The improvement as set forth in claim 18 wherein the axis of tiltable movement of the counterweight comprises a knife-edge bearing.

20. The improvement as set forth in claim 18 wherein the hanger means comprises a flexible tape which will not elongate appreciably under load.

* * * * *